United States Patent
Whiteford et al.

(10) Patent No.: US 12,509,221 B2
(45) Date of Patent: Dec. 30, 2025

(54) FORCE GENERATOR WITH CENTER ATTACHMENT AND/OR REDUNDANT ATTACHMENT POINTS

(71) Applicant: LORD Corporation, Cary, NC (US)

(72) Inventors: Gerald P Whiteford, Waterford, PA (US); Sean A Coots, Durham, NC (US); Douglas A Swanson, Cary, NC (US); John L Sheppard, New Hill, NC (US); Michael D Janowski, Clayton, NC (US); Douglas C Leicht, Cranesvile, PA (US)

(73) Assignee: Lord Corporation, Cary, NC (US)

( * ) Notice: Subject to any disclaimer, the term of this patent is extended or adjusted under 35 U.S.C. 154(b) by 441 days.

(21) Appl. No.: 18/116,051

(22) Filed: Mar. 1, 2023

(65) Prior Publication Data
US 2024/0059404 A1 Feb. 22, 2024

Related U.S. Application Data

(60) Provisional application No. 63/337,411, filed on May 2, 2022.

(51) Int. Cl.
*B64C 27/00* (2006.01)

(52) U.S. Cl.
CPC ...... *B64C 27/001* (2013.01); *B64C 2027/003* (2013.01)

(58) Field of Classification Search
CPC .............. B64C 2027/003; B64C 11/008; F16B 13/124; F16B 39/103; F16B 39/105
See application file for complete search history.

(56) References Cited

U.S. PATENT DOCUMENTS

| 4,105,058 | A | * | 8/1978 | Bunn | F16B 39/105 |
| | | | | | 411/113 |
| 8,469,667 | B2 | * | 6/2013 | Girard | F16F 7/116 |
| | | | | | 416/500 |
| 9,073,627 | B2 | | 7/2015 | Jolly et al. | |
| 9,776,712 | B2 | | 10/2017 | Jolly et al. | |
| 10,296,021 | B2 | | 5/2019 | Swanson et al. | |
| 10,392,102 | B2 | | 8/2019 | Jolly et al. | |
| 10,393,216 | B2 | | 8/2019 | Swanson | |
| 2005/0075210 | A1 | | 4/2005 | Frederickson | |
| 2012/0174699 | A1 | | 7/2012 | Hoffmann et al. | |
| 2015/0321753 | A1 | | 11/2015 | Black et al. | |
| 2016/0195161 | A1 | | 7/2016 | Hunter et al. | |
| 2018/0038439 | A1 | | 2/2018 | Lee et al. | |
| 2018/0093759 | A1 | | 4/2018 | Jolly et al. | |
| 2020/0130820 | A1 | | 4/2020 | Heverly et al. | |

FOREIGN PATENT DOCUMENTS

| CN | 3320679 A | * | 4/2015 | | |
| KR | 101299723 B1 | * | 8/2013 | ............ | F16B 13/124 |
| WO | WO-2020229287 A1 | * | 11/2020 | ........... | B64D 27/404 |

* cited by examiner

Primary Examiner — Daniel D Yabut
(74) Attorney, Agent, or Firm — McAfee & Taft, P.C.

(57) ABSTRACT

The present disclosure provides an improved circular force generator having a housing configured to reduce vibrational forces transmitted to an aircraft structure. Additionally, the disclosed configuration provide the necessary safety redundancies required by the aviation industry. The circular force generator includes mounting point around the exterior of the CFG housing and a central mounting point thereby providing redundant mounting points.

20 Claims, 9 Drawing Sheets

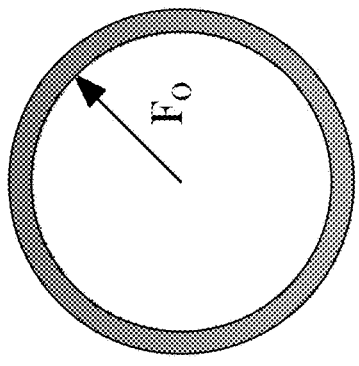
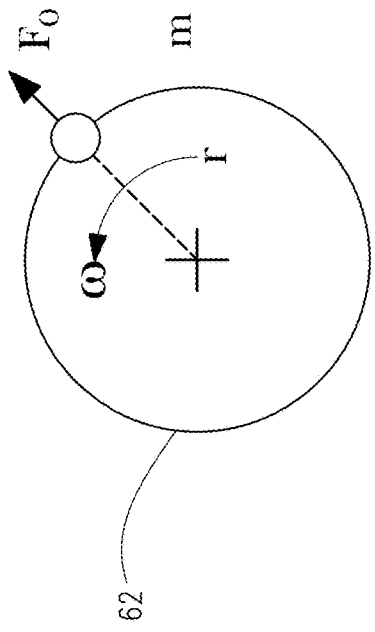
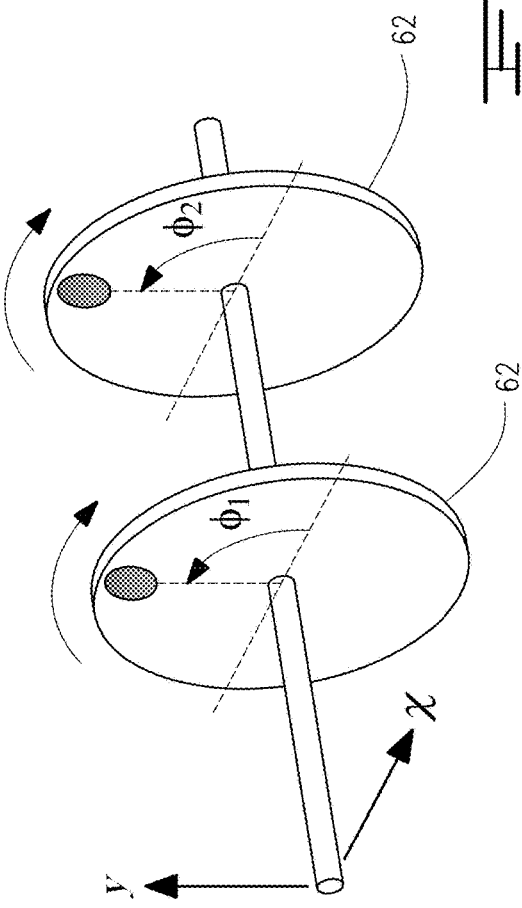
FIG. 2
PRIOR ART

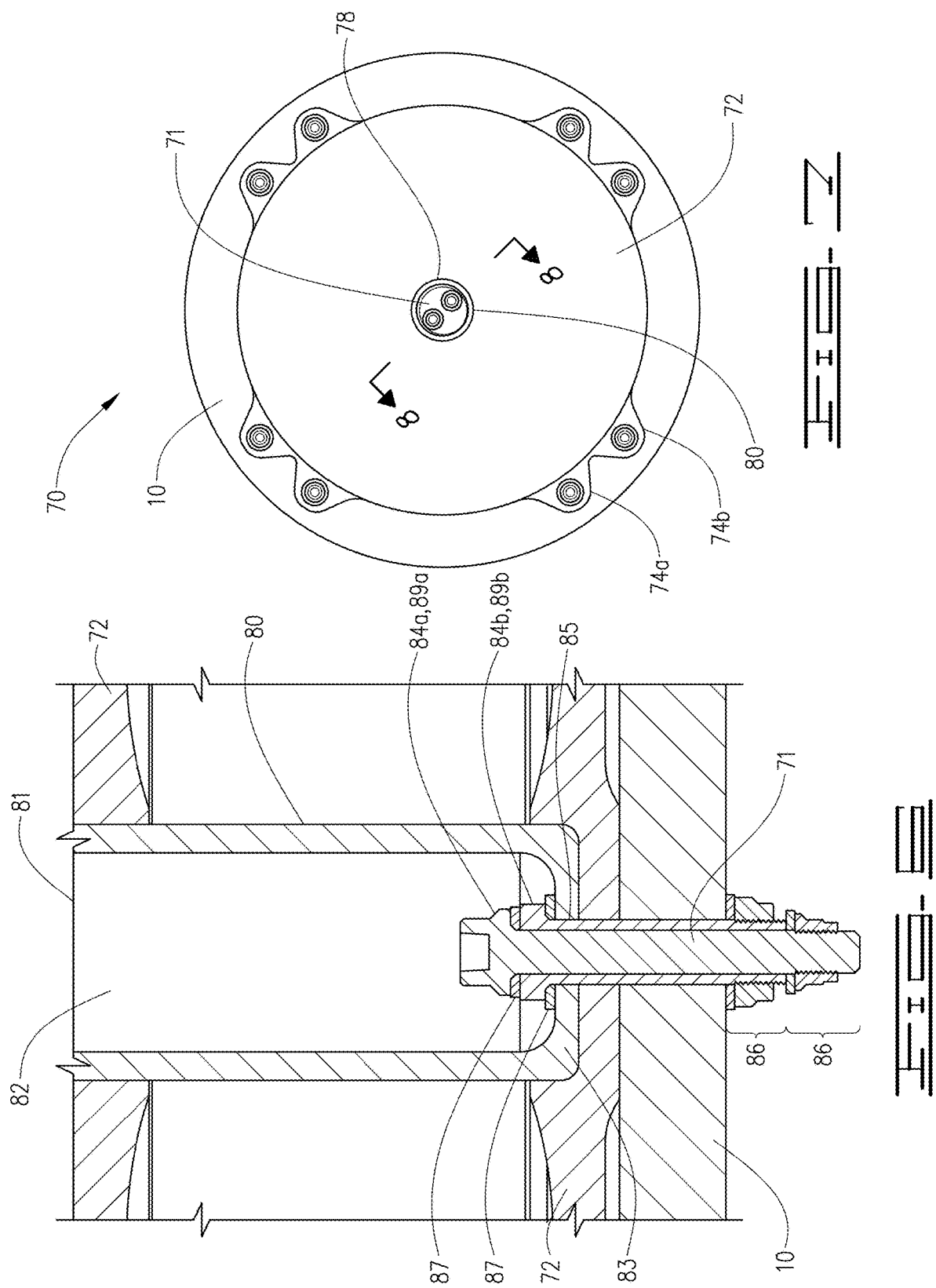

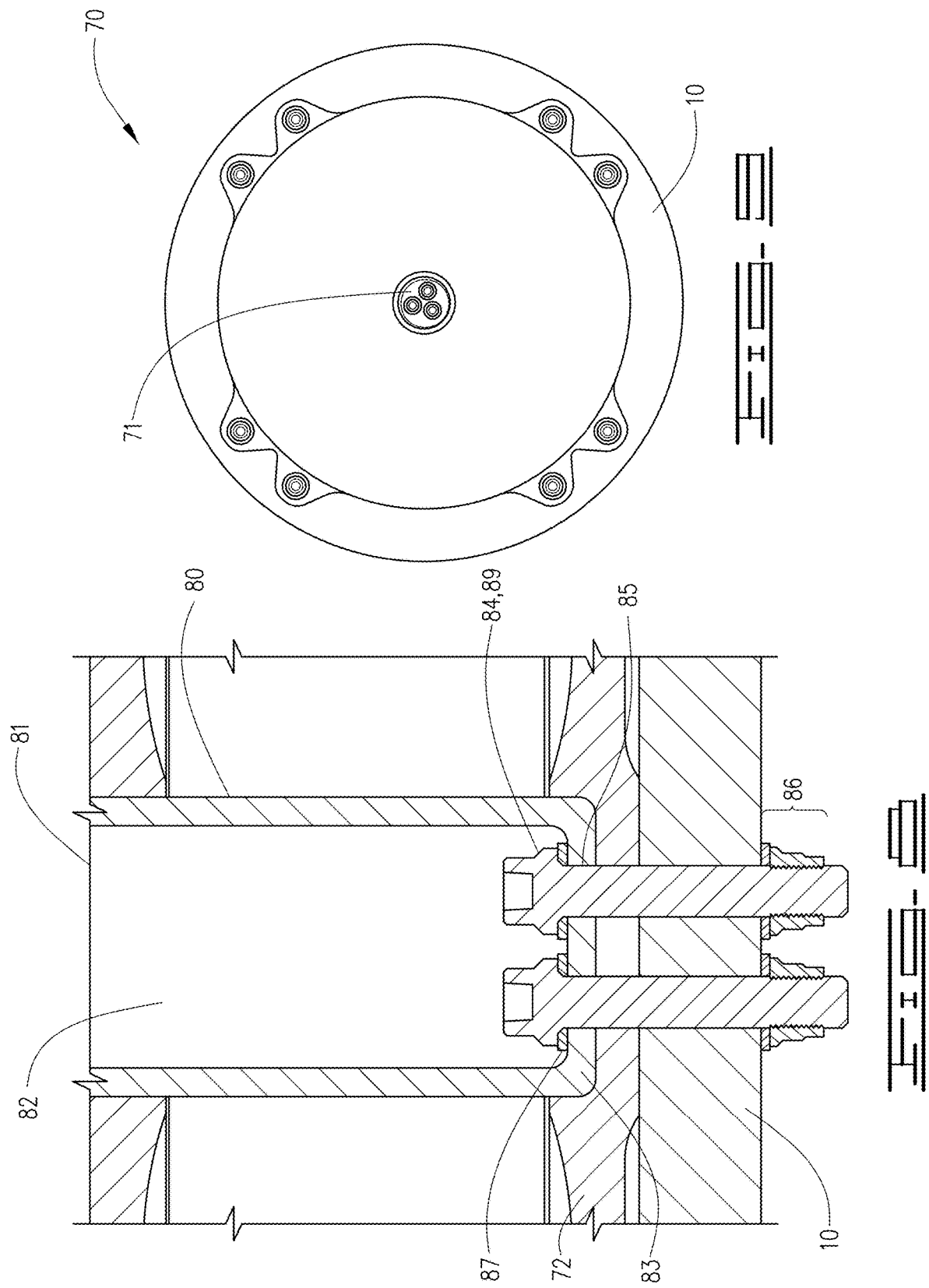

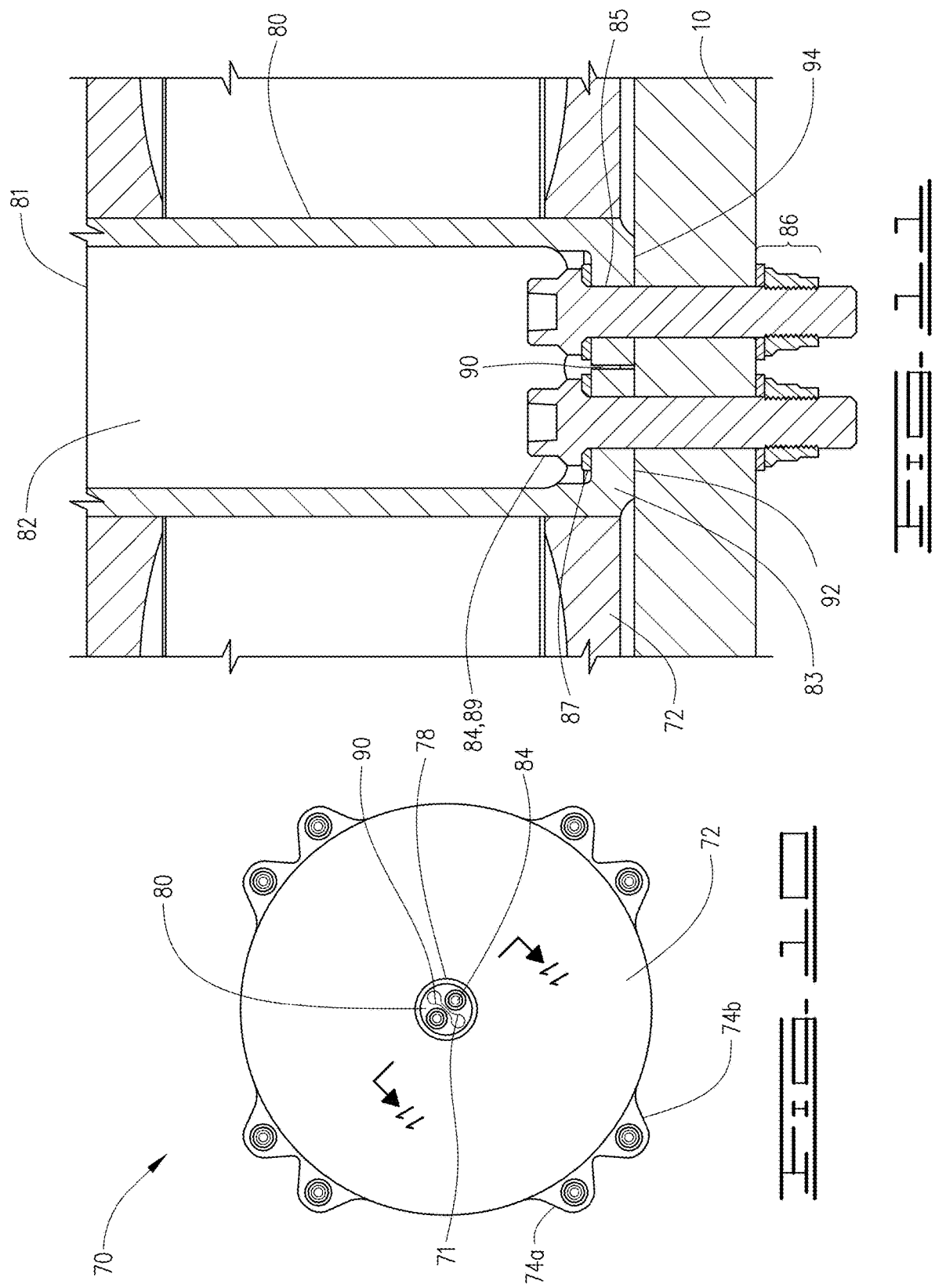

FORCE GENERATOR WITH CENTER ATTACHMENT AND/OR REDUNDANT ATTACHMENT POINTS

CROSS REFERENCE TO RELATED APPLICATIONS

The present application claims priority to U.S. Provisional Application No. 63/337,411 filed on May 2, 2022 which is incorporated herein.

STATEMENT REGARDING FEDERALLY SPONSORED RESEARCH OR DEVELOPMENT

This invention was made with government support under Contract Number W9124P-19-9-001 awarded by U.S. Army. The government has certain rights in the invention.

BACKGROUND

Active Vibration Control Systems (AVCS) are currently in production on many helicopters. AVCS cancel helicopter vibration by providing dynamic forces that cancel the vibration from the main rotor. An AVCS consists of Force Generators, a Controller, and Vibration Sensors (accelerometers).

An example of the use of currently available force generators is depicted in FIG. 1. In FIG. 1, force generator 40 provides cancelling forces to the aircraft structure. A controller 50 receives data input from vibration sensors 30 and main rotor speed sensor 20. Controller 50 uses the data received from the sensors to manage operation of force generators 40.

SUMMARY OF THE INVENTION

This disclosure provides a circular force generator (CFG) configured to be mounted to a structure, e.g. an aircraft or other structure which also supports an engine. The housing of the circular force includes a central opening and a plurality of mounting lugs positioned around an exterior of the housing. Each mounting lug has a least one mounting lug hole passing through the mounting lug. Optionally, the mounting lug may be a split lug having two mounting lug holes. A first fastener passes through each mounting lug hole and engages the structure or secures the CFG to the structure. Alternatively, the structure carries a fastener, e.g. a stud, suitable for securing the circular force generator to the structure. The housing of the CFG includes an inner shaft positioned within the central opening. The inner shaft has a central passage extending from a first open end to a second closed end. The closed end of the central passage includes a closed end hole passing through the closed end. A second fastener passing through the closed end hole, engages the structure or secures the CFG to the structure. Alternatively, the structure carries or supports the fastener, e.g. a stud, suitable for securing the circular force generator to the structure. Thus, the CFG is secured to the structure around the perimeter of the CFG and at a central mounting point.

In some embodiments, the fastener is a compound fastener in the form of a bolt positioned within and passing through a second hollow bolt. Other embodiments provide for the use of two bolts located within two closed end holes. Optionally, the two closed end holes may be separated by a split in the material of the closed end hole. These embodiments further provide for a configuration wherein the CFG housing adjacent to the inner shaft portion does not contact the structure. Rather, in the central region of the CFG, only the inner shaft portion of the CFG contacts the structure supporting the CFG. Thus, in these embodiments, the CFG housing has a center attachment point and peripheral mounting points at the mounting lugs. Other embodiments additionally provide for reinforcing ribs in the outer surface of the CFG housing.

In yet another embodiment, this disclosure describes a CFG mounting system wherein the structure supporting the CFG has one or two layers. Positioned within the layers are one or two holes. The holes may be threaded or the holes may contain threaded inserts. The CFG mounting system includes a housing having a central opening and a plurality of mounting lugs positioned around an exterior of the housing. Each mounting lug has a least one mounting lug hole passing through the mounting lug. Optionally, the mounting lug may be a split lug having two mounting lug holes. A first fastener passes through each mounting lug hole and engages the structure or secures the CFG to the structure. Alternatively, the structure carries a fastener, e.g. a stud, suitable for securing the circular force generator to the structure. The housing of the CFG includes an inner shaft positioned within the central opening. The inner shaft has a central passage extending from a first open end to a second closed end. The closed end of the central passage includes a closed end hole passing through the closed end. A second fastener passing through the closed end hole, engages the threaded hole or the threaded insert within the hole of the structure. When the second fastener is a compound fastener, the bolt passing through the hollow bolt will extend beyond the hollow bolt to engage the threads or threaded insert in one hole of one layer of the structure and the hollow bolt will engage the threads or threaded insert in a hole in a different layer of the structure. Thus, the CFG is secured to the structure around the perimeter of the CFG and at a central mounting point. In most embodiments, a compound fastener will be used in connection with a structure support having two layers; however, a compound fastener may be used with structures having a single layer. In this instance, the hole in the structure will have a first length of a given diameter and a second length of a different diameter where the diameters correspond to the outer diameters of the respective bolts.

BRIEF DESCRIPTION OF THE DRAWINGS

FIG. 2 depicts imbalance rotors of a circular force generator and the vector forces resulting from rotation of the imbalance rotors.

FIG. 6 is a partial cross-sectional view taken along lines 6-6 of FIG. 5 depicting the bolt within a bolt configuration used at the center of the CFG housing.

FIG. 7 depicts an alternative embodiment of an improved CFG housing wherein the center attachment includes two bolts located within the inner shaft of the housing.

FIG. 8 is a partial cross-sectional view taken along lines 8-8 of FIG. 7 depicting the two bolt configuration used at the center of the CFG housing.

FIG. 9 depicts another embodiment of improved CFG corresponding to that of FIG. 7 but with three bolts providing the center point attachment.

FIG. 10 provides an alternative embodiment of the improved CFG housing wherein the inner shaft of the CFG is a split inner shaft at the end of the shaft.

FIG. 11 is a partial cross-sectional view taken along lines 11-11 of FIG. 10 depicting the two bolt configuration used at the center of the CFG housing with a split inner shaft at the end of the shaft.

DETAILED DESCRIPTION

Figure 1:
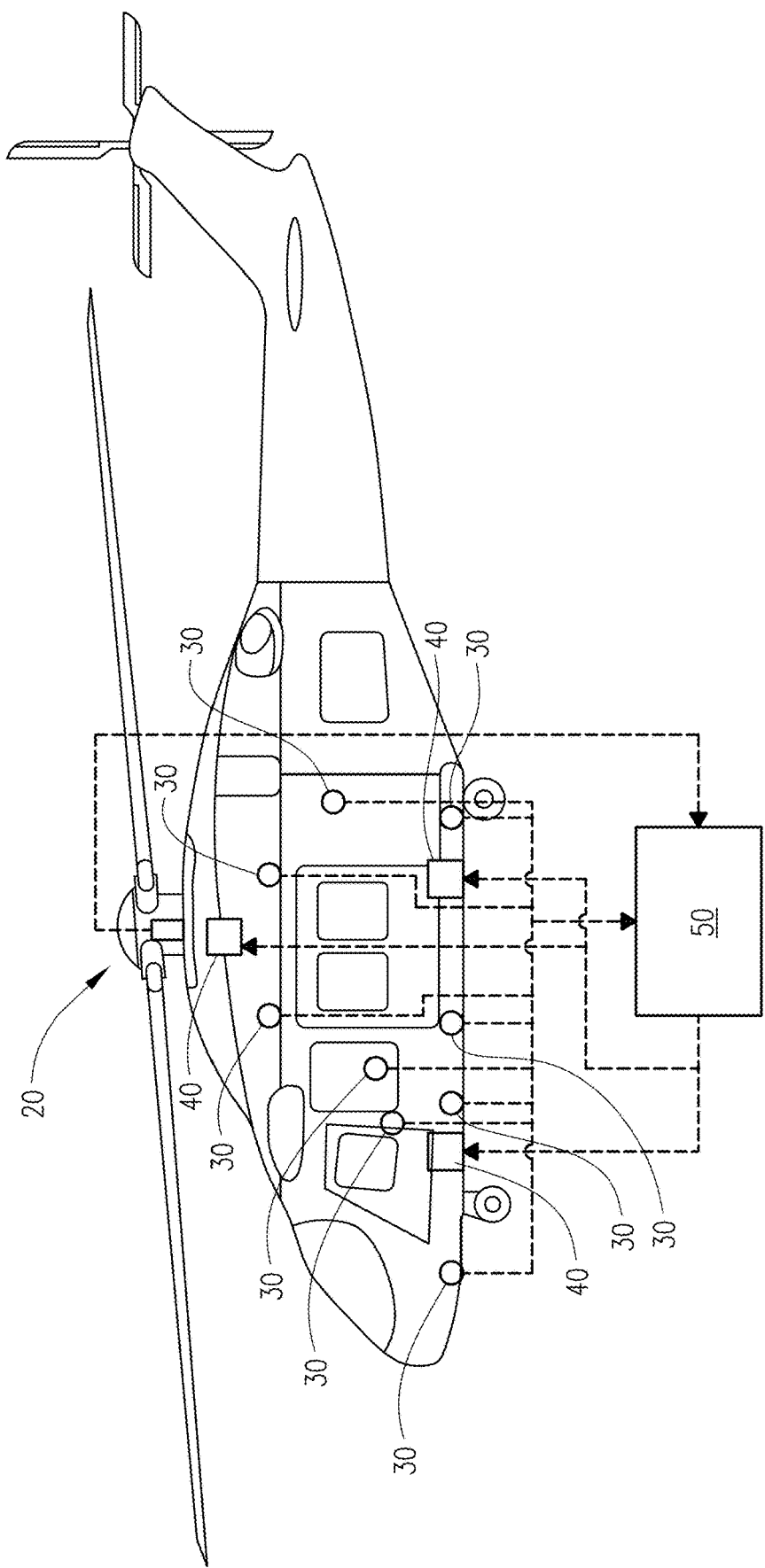
FIG. 1 depicts a prior art application of force generators in an aircraft.

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

The present disclosure may be understood more readily by reference to these detailed descriptions. For simplicity and clarity of illustration, where appropriate, reference numerals may be repeated among the different figures to indicate corresponding or analogous elements. The following description is not to be considered as limiting the scope of the embodiments described herein. The drawings are not necessarily to scale and the proportions of certain parts may have been exaggerated to better illustrate details and features of the present disclosure. Also, the phraseology and terminology employed herein is for the purpose of description and should not be regarded as limiting except where indicated as such.

Throughout this disclosure, the terms "about", "approximate", and variations thereof, are used to indicate that a value includes the inherent variation or error for the device, system, or measuring method being employed as recognized by those skilled in the art.

Figure 3:
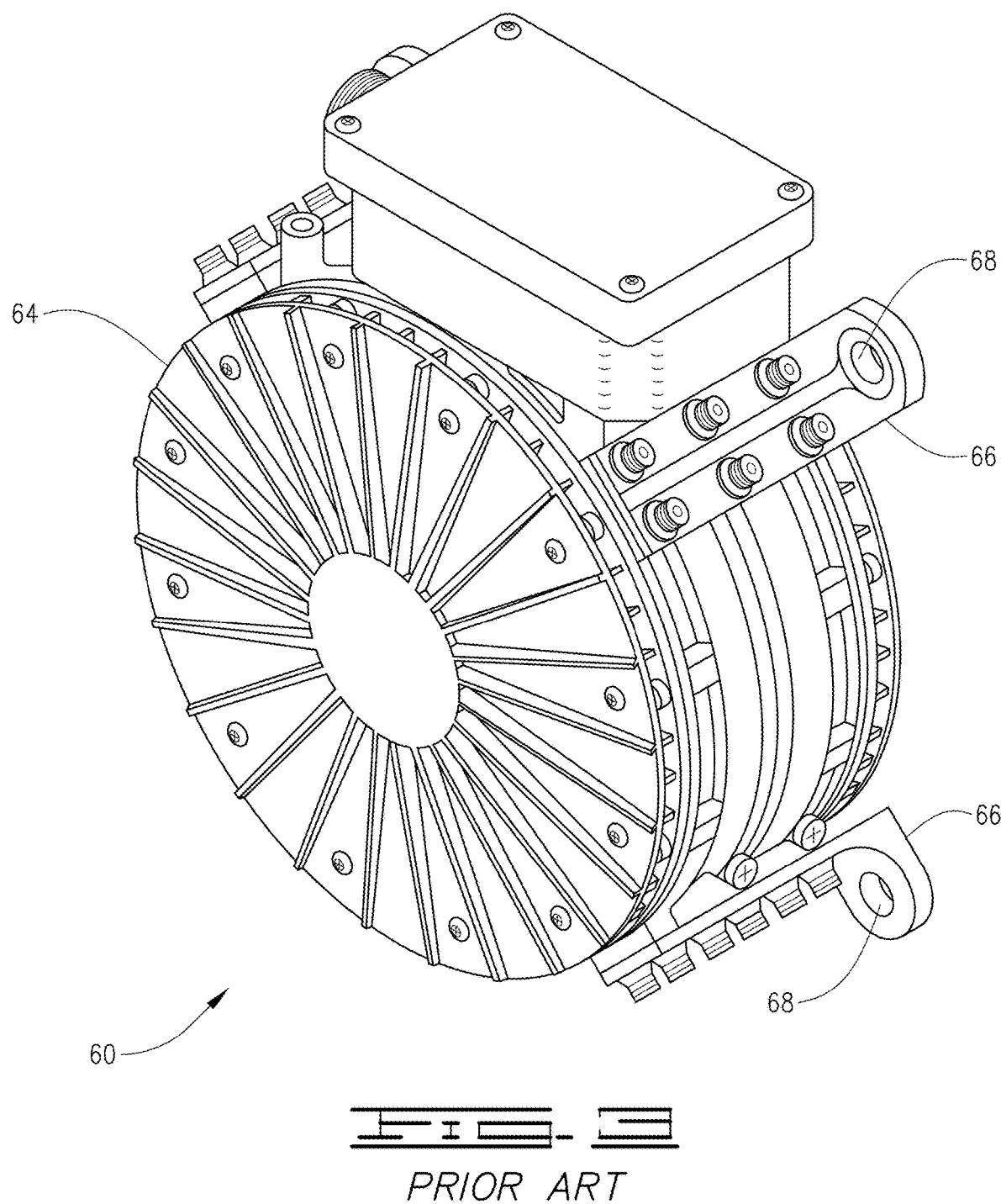
FIG. 3 depicts a prior art circular force generator mounting housing.

One common form of a force generator suitable for use in Active Vibration Control Systems (AVCS) is a circular force generator 60. As depicted in FIG. 2, circular force generators (CFG) 60 may have a single imbalance rotor 62 or a plurality of imbalance rotors 62. An example of a prior art CFG 60 mounting housing 64 is provided by FIG. 3. As depicted, housing 64 carries four mounting lugs 66 for securing housing 64 to the aircraft structure (not shown). Mounting lugs 66 have holes 68 suitable for receiving either bolts or studs (not shown). Thus, a bolt may pass through lug 66 and engage a mounting point on the aircraft to secure housing 64 to the aircraft. Likewise, the aircraft mounting point may be provided with threaded studs. Housing 64 will be placed on the studs and secured by nuts.

Prior art CFGs 60 are inadequate for situations requiring large output forces necessary to offset vibrations in certain aircraft. In particular, present designs for securing CFGs having diameters in excess of 300 mm are insufficient. The large force output of such designs present the risk of housing structural failure and loss of the CFG from the aircraft. Further, current designs lack the safety redundancies required by the aviation industry. With reference to FIGS. 4-12, the present disclosure provides embodiments which overcome the shortcomings of currently available CFGs.

The center attachment improves stiffness of the housing and improves its modal response and redundant attachments and/or ribs add safety redundancy and damage tolerance. Additionally, as a surprising consequence of the improved designs with center attachment point disclosed herein, the improvements also permit use of CFGs 70 which are smaller and lighter in weight.

Figure 4:
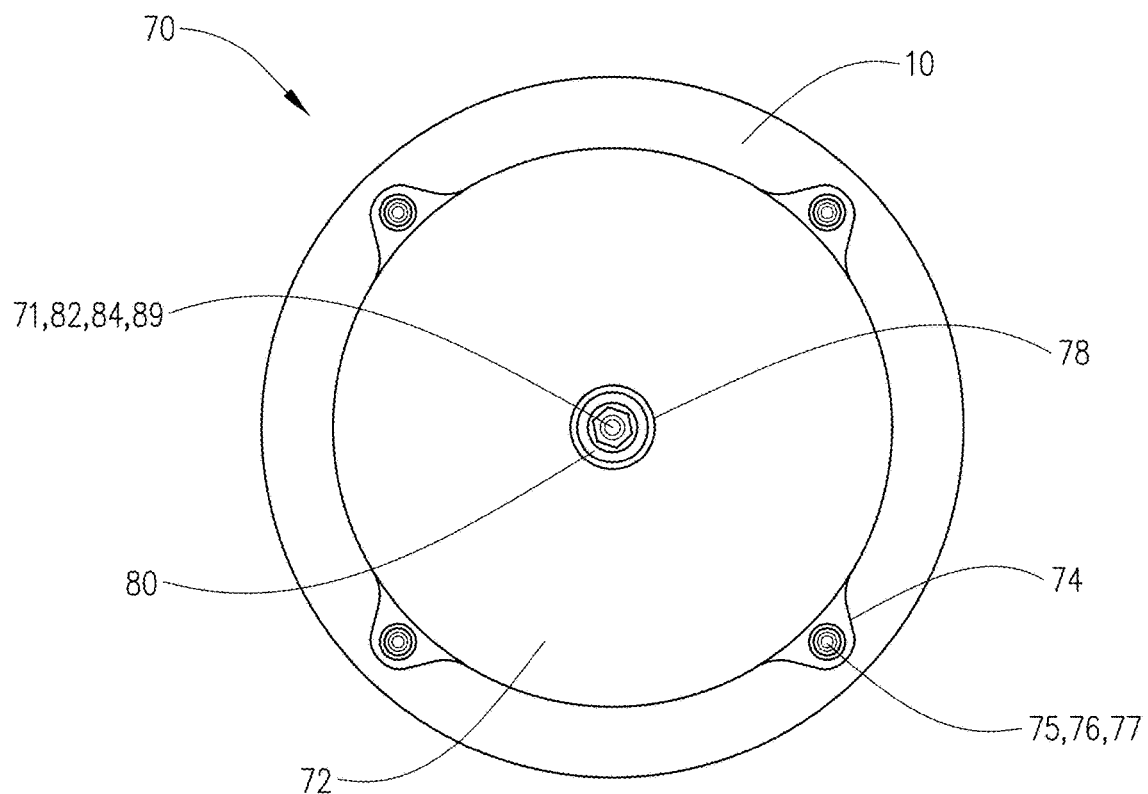
FIG. 4 depicts an improved CFG housing.

In FIG. 4, one embodiment of an improved CFG 70 is depicted as attached to an aircraft structure 10. However, CFG 70 will find application in any environment which requires reduction of vibrational forces. For simplicity, the following discussion will refer to aircraft structure 10; however, as noted other structures and vehicles will benefit from the improvements provided by CFG 70. CFG 70 has an improved housing 72 secured to aircraft structure 10. Housing 72 is generally a two part housing with a removable cover at the upper side of housing 72. Housing 72 includes mounting lugs 74 with holes 75 providing a passageway for receiving a fastener such as a stud or bolt 76. Stud 76 will be part of the aircraft structure 10. When housing 72 is mounted using stud 76, then a nut/washer assembly 77 will also be used to secure housing 72 to aircraft structure 10. Alternatively, aircraft structure 10 may include a threaded opening (not shown) suitable for receiving a bolt 76. Washers and other common devices suitable for enhancing retention of housing 72 by nut 77 or bolt 76 may also be used to ensure retention of housing 72 to aircraft structure 10. Housing 72 also includes a central opening 78 with the inner shaft 80 of CFG 70 positioned within central opening 78. Positioned between inner shaft 80 and the imbalance rotors (not shown) is a bearing (not shown). The bearing supports and rotates with the rotating imbalance rotors on stationary inner shaft 80. Arrangements of such bearings, shafts and rotors are well known in the art. Given that the inner functional elements of CFG 70 are known, the following discussion will focus on the improvements provided by the configuration and elements of improved housing 72. Also, not shown, but known to those skilled in the art, are motors associated with the rotating imbalance rotors. These motors impart motion to the imbalance rotors.

Inner shaft 80 has a central passage 82 which extends from a first open end 81 to a second closed end 83 of inner shaft 80. Inner shaft 80 engages housing 72 adjacent to first open end 81 and second closed end 83. A fastener such as a bolt 84 or stud 84 extends through a hole 85 located in the closed end 83. Bolt/stud 84 provides an additional securement point retaining housing 72 to aircraft structure 10. When using bolt 84, aircraft structure 10 may have a suitable threaded hole (not shown) for receiving bolt 84. Alternatively, bolt 84 may pass through aircraft structure 10 and be retained by a nut/washer assembly 86. When aircraft structure 10 carries a stud 84, inner shaft 80 will be positioned over stud 84 and retained by a nut/washer 86. Thus, the embodiment of FIG. 4 and each of the subsequent embodiments provides the improvement of a center attachment point 71 for housing 72. Center attachment point 71 corresponds in location to central opening 78.

Figure 5:
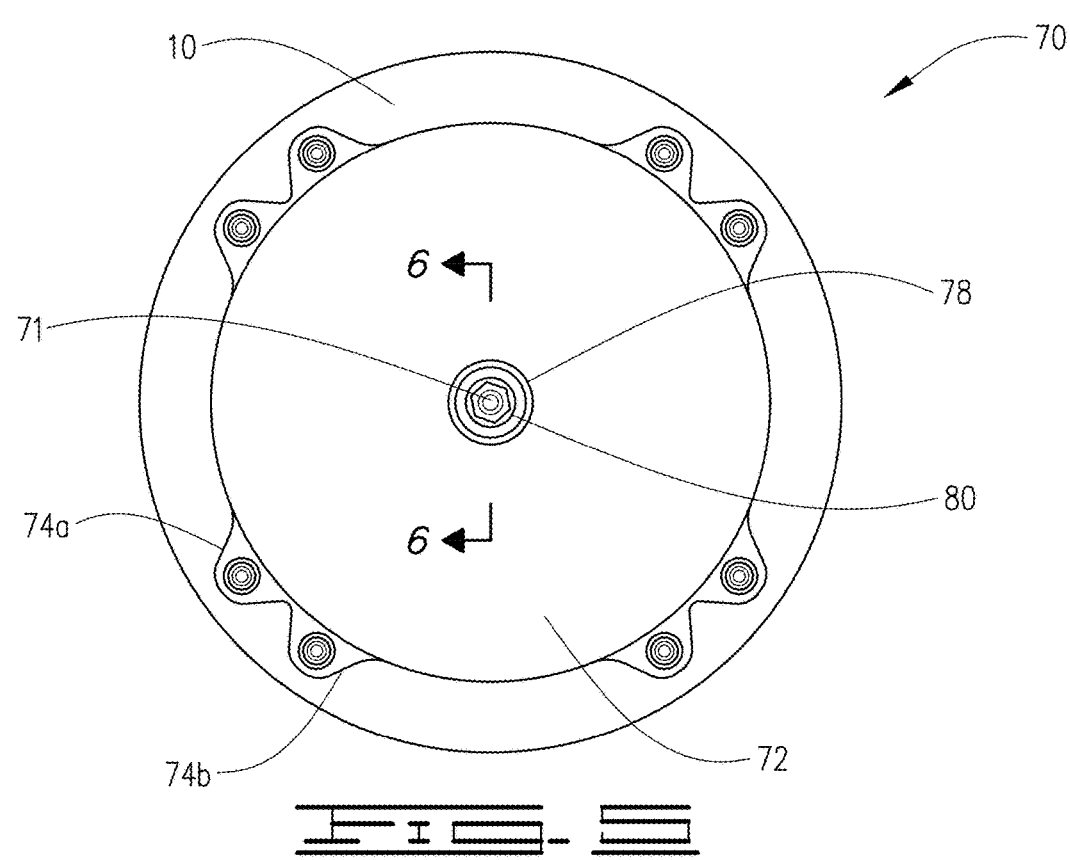
FIG. 5 depicts an alternative embodiment of an improved CFG housing with redundant attachment and a bolt within a bolt attachment at the center of the CFG housing.

FIG. 5 provides an alternative embodiment of improved CFG 70. Specifically, the embodiment of FIG. 5 provides enhanced safe operations of an aircraft by providing redundant mounting points. Specifically, this embodiment corresponds to that of FIG. 5 with the exception of the configuration of mounting lugs 74. As depicted in FIG. 5, mounting lugs 74 have a split lug configuration, i.e. each lug 74 is a pair of adjacent lugs, having components 74a and 74b. The split lug configuration provides redundancy at each securement point. Thus, the fracture of any component 74a or 74b does not risk loss of the attachment point. Further, a fracture at one mounting lug hole 75 does not travel to the adjacent mounting lug hole 75.

Further, as depicted in the cross-sectional view of FIG. 6, the embodiment of FIG. 5 provides a second point of redundancy. In this embodiment, bolt 84 is a compound fastener. As a compound fastener, bolt 84 can be described as having a bolt 84a within a bolt 84b configuration. As depicted in FIG. 6, bolt 84b is hollow. Bolt 84b passes through inner shaft 80, housing 72 and aircraft structure 10. A nut/washer 86 retains bolt 84b. Bolt 84a passes through bolt 84b and is retained by nut/washer 86. A washer 87 may be located between the head 89b of bolt 84b and inner shaft 80. Likewise, an optional washer 87 may be positioned between the bolt head 89a of bolt 84a and bolt head 89b. Thus, bolt head 89b may directly or indirectly engage inner shaft 80. Likewise, bolt head 89a may directly or indirectly engage bolt head 89b. Thus, the embodiment of FIGS. 5 and 6 provide multiple redundancies for securement of housing 72 to aircraft structure 10. In addition to the duplication of each structural attachment 74a, 74b and center bolts 84a, 84b, the center bolt configuration 84a, 84b provides enhanced safety in that failure of either housing 72 or inner shaft 80 in the area around bolts 84a, 84b will not result in loss of the joint as the double bolt 84a, 84b configuration provides two distinct load paths. As depicted in FIG. 6, inner shaft 80 directly contacts housing 72 and housing 72 directly contacts aircraft structure 10.

FIGS. 7 and 8 depict an alternative embodiment wherein two bolts 84 are positioned within inner shaft 80. As in FIGS. 5 and 6, this embodiment has split lugs 74a and 74b. However, in place of the bolt within a bolt configuration, this embodiment utilizes two bolts 84 passing through inner shaft 80, housing 72 and aircraft structure 10. This embodiment also provides for optional washers 87 between bolt heads 89 and end 83. In this embodiment, bolts 84 may be replaced by studs (not shown) carried by aircraft structure 10. As depicted in FIG. 8, inner shaft 80 directly contacts housing 72 and housing 72 directly contacts aircraft structure 10. Thus, the embodiment of FIGS. 7 and 8 provide an alternative configuration which includes multiple redundancies for retaining housing 72 to aircraft structure 10. Likewise, FIG. 9 corresponds to the embodiment of FIG. 7 except that this embodiment utilizes three bolts 84 located within inner shaft 80.

FIGS. 10 and 11 depict an alternative embodiment of CFG housing 72 wherein inner shaft 80 has a split 90 located in end 83 with two bolts 84 securing shaft 80 and housing 72 to aircraft structure 10. In this embodiment, the split 90 is located between bolts 84 or studs 84. Split 90 serves to isolate the mounting points 92 and 94 between inner shaft 80 and aircraft structure 10. In this embodiment, center attachment 71 through CFG 70 is only through the inner shaft 80 and not the CFG housing 72 and inner shaft 80, as shown in the earlier embodiments. The slight gap provided by split 90 between two center bolts 84 helps prevent cracks in the inner shaft 80 from propagating from one bolt hole 85 to the other bolt hole 85, similar to the split lug concept shown on the outer mounting lugs 74a, 74b. As depicted in FIG. 11, split 90 optionally ends in an enlarged open area to provide a reduced stress concentration associated with split 90. As depicted in FIG. 11, inner shaft 80 directly contacts aircraft structure 10 thus center attachment point 71 of housing 72 provides the only central contact with aircraft structure between the perimeter of housing 72 and inner shaft 80. Thus, the central region of housing 72 does not contact aircraft structure 10. In other words, CFG 70 contacts aircraft structure 10 only at inner shaft 80 and mounting lugs 74 or 74a, 74b. In this embodiment, contact between the central region of housing 72 and aircraft structure 10 is not needed for redundancy as inner shaft 80 has independent mounting features. Thus, this embodiment also provides at least one redundancy for each attachment point.

Figure 12:
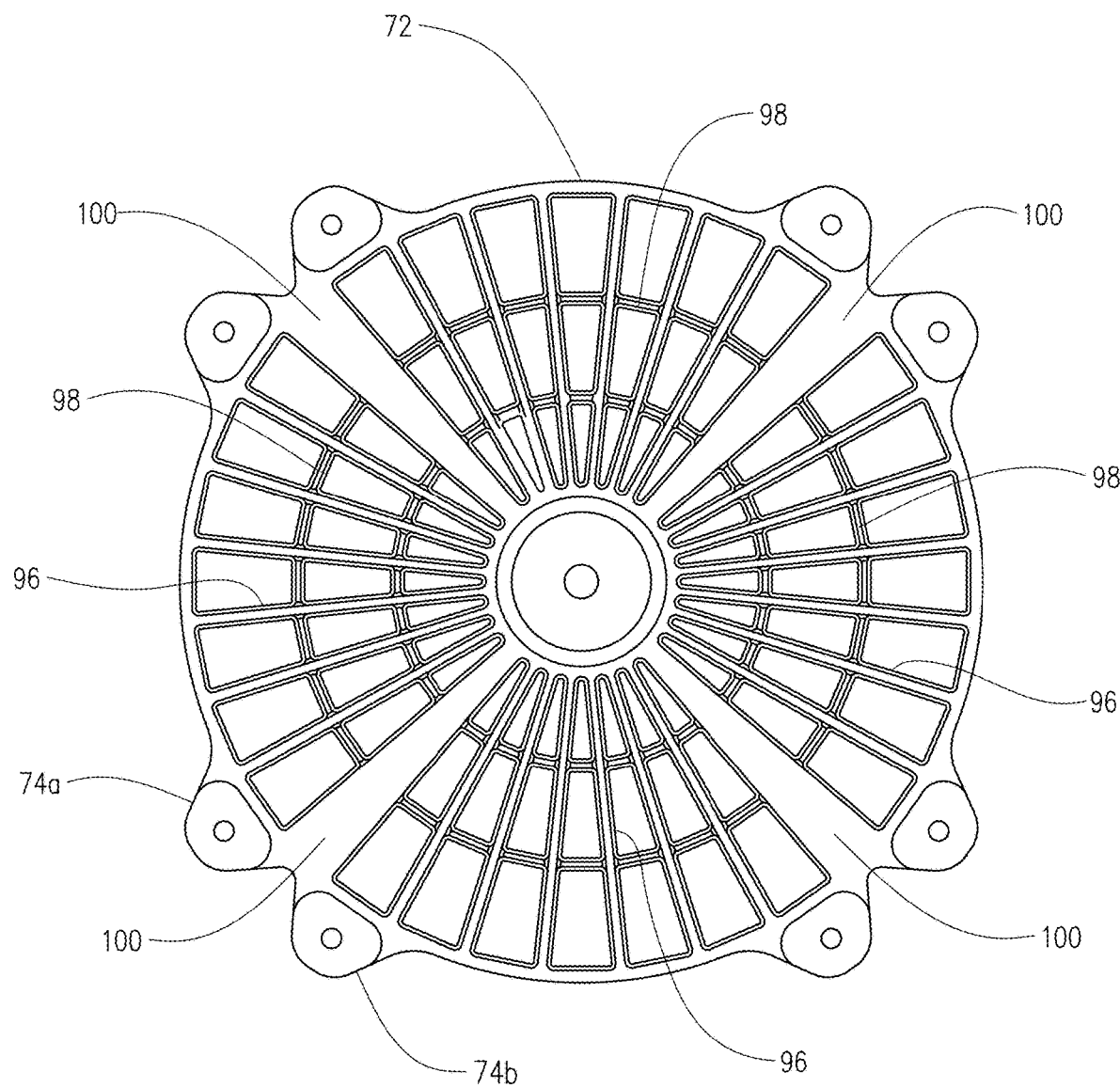
FIG. 12 provides an embodiment of an improved CG housing with a plurality of ribs to arrest cracks.

In yet another embodiment depicted in FIG. 12, housing 72 includes a plurality of intermediate radial ribs 96 radiating from proximate to center attachment point 71 to the outer portion of housing 72. Additional intermediate circular ribs 98 are also present. Intermediate ribs 96, 98 provide structural enhancement to housing 72. However, due to the operational stress of CFG 70 cracks may still occur within housing 72. Therefore, to preclude circular propagation of a crack, this embodiment includes crack arresting ribs 100. Crack arresting ribs 100 are designed to withstand the additional stresses of a crack in housing 72 that arcs through the intermediate ribs 96, 98 and contain the crack for the design life of CFG 70. Crack arresting ribs 100 may have increased or decreased stiffness (through rib thickness or height) to prevent crack propagation. Inclusion of crack arresting ribs 100 increases damage tolerance and improves safety.

Figure 13:
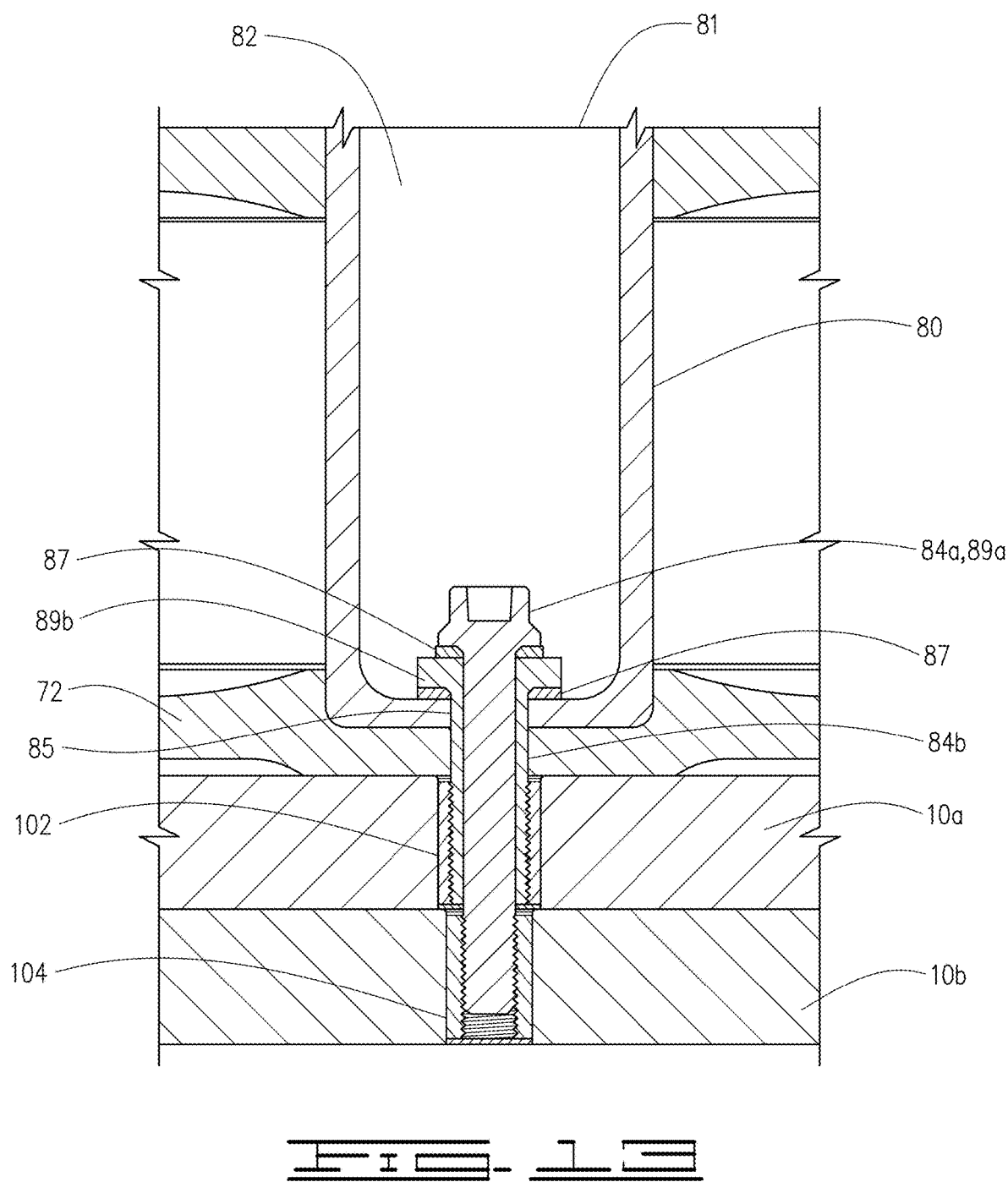
FIG. 13 depicts an alternative embodiment of a bolt within a bolt configuration suitable for use at the center of the CFG housing.

FIG. 13 depicts a variation of the embodiment of FIGS. 5 and 6. In the embodiment of FIG. 13, aircraft structure 10 may have single or double thickness at the location where CFG 70 is secured. When using the bolt within a bolt configuration depicted, first aircraft structure thickness 10a includes a threaded insert 102 and second aircraft structure thickness includes a threaded insert 104. In this configuration, outer bolt 84b engages threaded insert 102 while inner bolt 84a passes through outer bolt 84 and engages threaded insert 104. However, aircraft structure thicknesses 10a and 10b may omit threaded inserts 102 and 104 and use threads directly within the holes 85. This configuration provided safety redundancies through the combination of bolts 84a, 84b, aircraft structure thicknesses 10a, 10b and threaded inserts 102, 104. In the event of damage to either threaded insert 102, 104, the insert may be removed and replaced by a replacement insert of equal or greater outside diameter. Thus, this configuration improves the life of CFG 70 while improving safety. In most embodiments, compound fastener 84 will be used in connection with a structure support having two layers 10a, 10b; however, a compound fastener 84 may be used with structures having a single layer 10. In this instance, the hole in the structure will have a first length of a given diameter corresponding to the outer diameter of bolt 84a and a second length of a different diameter corresponding to the outer diameter of bolt 84b.

The improved designs described above permit the use of CFG 70 with a lighter housing. In particular, housing 72 with ribs 96, 98, 100 and center attachment point 71 has a lower overall mass than a conventional CFG 60. For example, for a 400 mm diameter CFG 70 with center attachment point 71 can be designed to place the first vibration natural frequency of the housing above 300 Hz to avoid damage due to high frequency aircraft vibration inputs. CFG 70 with center attachment point 71 and ribs 96, 98, 100 will have added housing stiffness/higher natural frequency at low weight and low CFG thickness. In contrast, a prior art CFG lacking the center attachment, while providing the same criteria described above, will require a housing structure having 68% more mass (with an up to 12% increase in overall CFG weight) to have an acceptable stiffness/vibration natural frequency as a CFG 70 with a center attachment. Weight benefits due to having a center attachment 71 will be even greater if either the stiffness requirements increase (e.g., need a housing with a natural frequency greater than 300 Hz) or if the CFG diameter increases. Further, a reduced CFG housing structure thickness is achievable with a center attachment because less structural material (e.g., ribs) is needed to achieve the same stiffness.

Other embodiments of the present invention will be apparent to one skilled in the art. As such, the foregoing description merely enables and describes the general uses and methods of the present invention. Accordingly, the following claims define the true scope of the present invention.

What is claimed is:

1. A circular force generator configured to be mounted to a structure, the circular force generator comprising:
    a housing, the housing having a central opening and a plurality of mounting lugs positioned around an exterior of the housing;
    each mounting lug having a least one mounting lug hole passing through the mounting lug;
    a first fastener passing through each mounting lug hole within the mounting lug, the fastener engaging the structure or carried by the structure thereby securing the circular force generator to the structure;
    an inner shaft positioned within the central opening, the inner shaft having a central passage extending from a first open end to a second closed end;
    a closed end hole passing through the closed end; and,
    a second fastener passing through the closed end hole, the second fastener engaging the structure or carried by the structure thereby securing the circular force generator to the structure.

2. The circular force generator of claim 1, wherein each mounting lug has a split configuration comprising a pair of adjacent lugs wherein each adjacent lug has at least one mounting lug hole.

3. The circular force generator of claim 1, wherein the inner shaft directly contacts the housing, and wherein the inner shaft directly contacts the structure.

4. The circular force generator of claim 1, wherein the inner shaft has a length from the first open end to the second closed end, and wherein the inner shaft directly contacts the structure.

5. The circular force generator of claim 1, wherein the second fastener is a compound fastener comprising a first bolt positioned within and passing through a second hollow bolt,
    wherein the second hollow bolt directly or indirectly engages the closed end of the inner shaft and wherein the first bolt directly or indirectly engages the second bolt, and
    wherein the compound fastener secures the circular force generator to the structure and the compound fastener provides two distinct load paths.

6. The circular force generator of claim 5, wherein the closed end of the inner shaft has a second closed end hole passing through the closed end, and wherein a second compound fastener passes through the second closed end hole, the second compound fastener engaging the structure thereby securing the circular force generator to the structure.

7. The circular force generator of claim 1, wherein the second fastener is a compound fastener comprising:
    a first bolt positioned within and passing through a second hollow bolt;
    the first bolt having a first bolt head and a first threaded end,
    the second hollow bolt having a second bolt head and a second threaded end, when the circular force generator is secured to the structure, the second threaded end passes through a hole within the structure and extends beyond a portion of the structure;
    a first nut secures the second hollow bolt and the circular force generator to the structure;
    the first bolt head directly or indirectly engages the second bolt head;
    the first bolt having a length sufficient to extend beyond the second threaded end of the second bolt; and,
    a second nut secures the first bolt within and against the second hollow bolt.

8. The circular force generator of claim 1, wherein the closed end of the inner shaft has a second closed end hole passing through the closed end, and
    wherein a third fastener passes through the second closed end hole, the third fastener engaging the structure or carried by the structure thereby securing the circular force generator to the structure.

9. The circular force generator of claim 8, wherein the housing contacts the structure at the mounting lugs only and the inner shaft provides a second contact point between the circular force generator and the structure; and,
    wherein the split defines two mounting points between the closed end of the shaft and the structure.

10. The circular force generator of claim 1, further comprising:
    an outer surface of the housing,
    a plurality of radial ribs, the radial ribs extending from a location proximate to the central opening to a position proximate to an outer edge of the housing;
    at least one intermediate circular rib located between the central opening and the outer edge of the housing;
    at least two crack arresting ribs, the crack arresting ribs having a width greater than the width of the radial ribs and the crack arresting ribs interrupting the intermediate circular rib.

11. A circular force generator mounting system:
    a housing, the housing having a central opening and a plurality of mounting lugs positioned around an exterior of the housing;
    each mounting lug having a least one mounting lug hole passing through the mounting lug;
    a first fastener passing through each mounting lug hole within the mounting lug, the fastener engaging the structure or carried by the structure thereby securing the circular force generator to the structure;
    an inner shaft positioned within the central opening, the inner shaft having a central passage extending from a first open end to a second closed end;
    a closed end hole passing through the closed end;
    a second fastener passing through the closed end hole, the second fastener having a first end with a bolt head and a second threaded end;
    a circular force generator support structure, the circular force generator support structure comprising:
        a mounting hole configured to receive the second fastener;
        threads positioned within the mounting hole, the threads within the mounting hole engage the second threaded end of the second fastener.

12. The circular force generator mounting system of claim 11, wherein the second fastener is a compound fastener, the compound fastener comprising:
    a first bolt positioned within and passing through a second hollow bolt, the second hollow bolt having a length;

the first bolt having a first bolt head, a first threaded end and a length greater than the length of the second hollow bolt, the second hollow bolt having a second bolt head and a second threaded end, the second threaded end passes into a first threaded passageway located in the circular force generator structure;

the first bolt first threaded end passes into a second threaded passageway located in the circular force generator.

13. The circular force generator of claim 12, wherein the first threaded passageway located in the circular force generator is a first threaded insert removably secured within the circular force generator support structure.

14. The circular force generator of claim 12, wherein the second threaded passageway located in the circular force generator is a second threaded insert removably secured within the circular force generator support structure.

15. A circular force generator configured to be mounted to a structure, the circular force generator comprising:

a housing, the housing having a central opening and a plurality of mounting lugs positioned around an exterior of the housing;

each mounting lug having a least one mounting lug hole passing through the mounting lug;

a first fastener passing through each mounting lug hole within the mounting lug, the fastener engaging the structure or carried by the structure thereby securing the circular force generator to the structure;

an inner shaft positioned within the central opening, the inner shaft having a central passage extending from a first open end to a second closed end;

a first closed end hole passing through the closed end;

a second closed end hole passing through the closed end;

a split located in the closed end between the first closed end hole and the second closed end hole;

a second fastener passing through the closed end hole, the second fastener engaging the structure or carried by the structure thereby securing the circular force generator to the structure; and, a third fastener passes through the second closed end hole, the third fastener engaging the structure or carried by the structure thereby securing the circular force generator to the structure.

16. The circular force generator of claim 15, wherein each mounting lug has a split configuration comprising a pair of adjacent lugs wherein each adjacent lug has at least one mounting lug hole.

17. The circular force generator of claim 15, wherein the inner shaft has a length from the first open end to the second closed end and the first inner shaft engages the housing along the entire length from the first open end to the second closed end, and wherein the inner shaft directly contacts the structure.

18. The circular force generator of claim 15, wherein the housing contacts the structure at the mounting lugs only and the inner shaft provides a second contact point between the circular force generator and the structure.

19. The circular force generator of claim 15, further comprising:

an outer surface of the housing, a plurality of radial ribs, the radial ribs extending from a location proximate to the central opening to a position proximate to an outer edge of the housing;

at least one intermediate circular rib located between the central opening and the outer edge of the housing;

at least two crack arresting ribs, the crack arresting ribs having a width greater than the width of the radial ribs and the crack arresting ribs interrupting the intermediate circular rib.

20. The circular force generator of claim 15, wherein the split defines two mounting points between the closed end of the shaft and the structure.

\* \* \* \* \*